United States Patent [19]

Kovach et al.

[11] Patent Number: 4,767,254
[45] Date of Patent: Aug. 30, 1988

[54] VEHICLE RESTRAINT HAVING AN UPWARDLY BIASED RESTRAINING MEMBER

[75] Inventors: Jonathan W. Kovach, Milwaukee; Martin P. Hageman, Mequon, both of Wis.

[73] Assignee: Kelley Company Inc., Milwaukee, Wis.

[21] Appl. No.: 854,386

[22] Filed: Apr. 21, 1986

[51] Int. Cl.⁴ .............................................. B65G 67/02
[52] U.S. Cl. ...................................... 414/401; 14/71.1
[58] Field of Search ................. 414/396, 401, 584; 14/71.1

[56] References Cited

U.S. PATENT DOCUMENTS

| | | | |
|---|---|---|---|
| 4,208,161 | 6/1980 | Hipp | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 14/71.1 |
| 4,400,127 | 8/1983 | Metz | 414/401 |
| 4,443,150 | 4/1984 | Hahn et al. | 414/401 |
| 4,472,099 | 9/1984 | Hahn | 414/401 |
| 4,488,325 | 12/1984 | Bennett et al. | 14/71.3 |
| 4,560,315 | 12/1985 | Hahn | 414/401 |
| 4,664,582 | 5/1987 | Edmeads | 414/401 |

*Primary Examiner*—Robert J. Spar
*Assistant Examiner*—Stuart J. Millman
*Attorney, Agent, or Firm*—Andrus, Sceales, Starke & Sawall

[57] ABSTRACT

A vehicle restraint for preventing accidental movement of a vehicle away from a loading dock. The vehicle restraint comprises a frame mounted on the front face of the dock and a restraining member having a hook-like configuration is mounted for movement on the frame between the lower storage position and an upper operative position where the restraining member is engaged with an abutment, such as an ICC bar, on the vehicle. The restraining member is biased upwardly to the operative position and a power operated unit is arranged to move the restraining member downwardly from the operative position to the storage position where it is locked in the storage position by a releasable latch. On release of the latch, the biasing mechanism will move the restraining member upwardly into engagement with the ICC bar, and the biasing mechanism enables the engaged restraining member to follow both upward and downward movement of the ICC bar during a loading operation.

9 Claims, 3 Drawing Sheets

VEHICLE RESTRAINT HAVING AN UPWARDLY BIASED RESTRAINING MEMBER

BACKGROUND OF THE INVENTION

Vehicle restraints are commonly employed to prevent a truck from accidentally pulling away from a loading dock during a loading operation. A conventional vehicle restraint is mounted on the front face of a dock and includes a hook-like restraining member that is movable between a lower storage position and an operative position where the restraining member engages the ICC bar at the rear end of the truck to prevent movement of the truck away from the dock. The ICC bar is a horizontal bar located at the rear of the truck, beneath the truck bed, and is designed to prevent a vehicle from underriding the truck in the event of a rear end collision.

Certain types of vehicle restraints are moved manually by an operator from the storage position to the operative position. In other types of vehicle restraints, the hook or restraining member is power driven to the operative position and is either power driven downwardly to the storage position or is arranged to fall by gravity to the storage position.

While all trucks must, by federal regulation, have an ICC bar, the height of the ICC bar above the ground can vary widely depending upon the type of truck. Because of this, a vehicle restraint must be designed to accommodate ICC bars that have a substantial variance in height above the ground, as for example, from about 15 inches to 30 inches.

During a loading operation, the truck bed will rise and fall. Depending upon the type of truck, the bed can rise or fall up to about 10 inches. For example, as a forklift truck moves from the dock to the truck bed, the truck bed will lower. As cargo is loaded onto the bed, the bed will also lower. Conversely, as cargo is removed from the truck bed, the bed will rise. It is essential that a vehicle restraint have the capability to follow both upward and downward float of the truck bed so that the hook or restraining member will remain in engagement with the ICC bar at all times.

SUMMARY OF THE INVENTION

The invention is directed to an improved vehicle restraint which is of inexpensive construction and will enable the restraining member to follow both upward and downward float of the truck bed through a wide operating range.

In accordance with the invention, the vehicle restraint includes a frame that is mounted on the front face of the loading dock, and a restraining member, which can be in the form of a hook, is mounted for movement on the frame between a lower storage position and an upper operative position where the restraining member is engaged with the ICC bar on the truck or other vehicle.

The restraining member is moved upwardly to the operative position by a biasing means, which can take the form of one or more gas springs, that urge the restraining member upwardly into engagement with the ICC bar.

After the loading operation is completed, the restraining member is moved downwardly by a power operated mechanism, such as a hydraulic cylinder, to the storage position and is automatically latched in the storage position.

When a truck is backed into position at a loading dock, the latching mechanism is released, and the gas springs will move the restraining member upwardly into engagement with the ICC bar. The gas springs are arranged so that the restraining member will engage the ICC bar at a location intermediate the ends of the stroke of the gas springs so that the gas springs will enable the restraining member to follow both upward and downward float of the truck bed during the loading operation.

After the loading operation is completed, the power operated mechanism is actuated to drive the restraining member downwardly against the force of the gas springs and the restraining member is automatically locked in the storage position.

The vehicle restraint of the invention provides a positive engagement of the restraining member or hook with the ICC bar of the truck and is capable of following both upward and downward float of the truck bed regardless of the position of the ICC bar relative to the ground.

On completion of the loading operation, the vehicle restraint is moved downwardly and latched in the storage position in a location where it will not interfere with normal operation of the loading dock.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
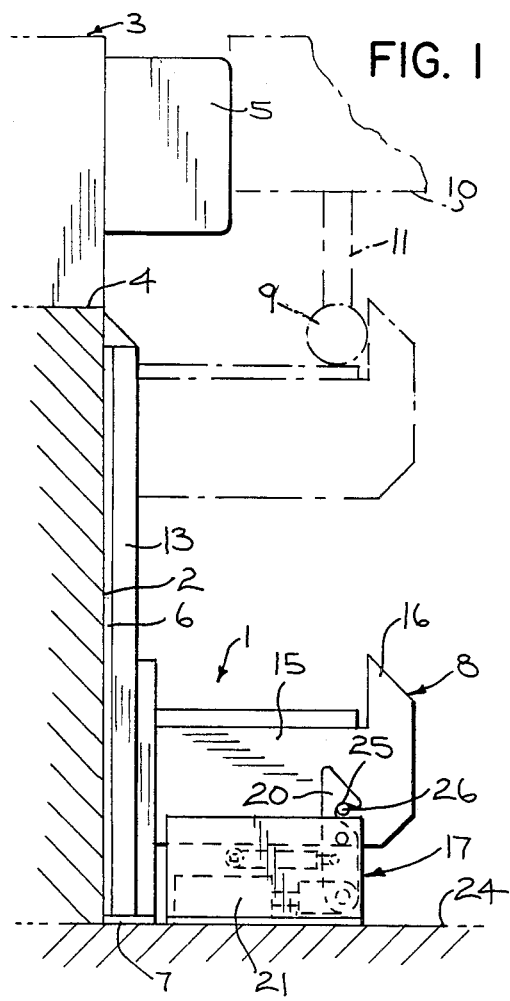
FIG. 1 is a side elevation of the vehicle restraint of the invention as mounted on a loading dock.
Figure 3:
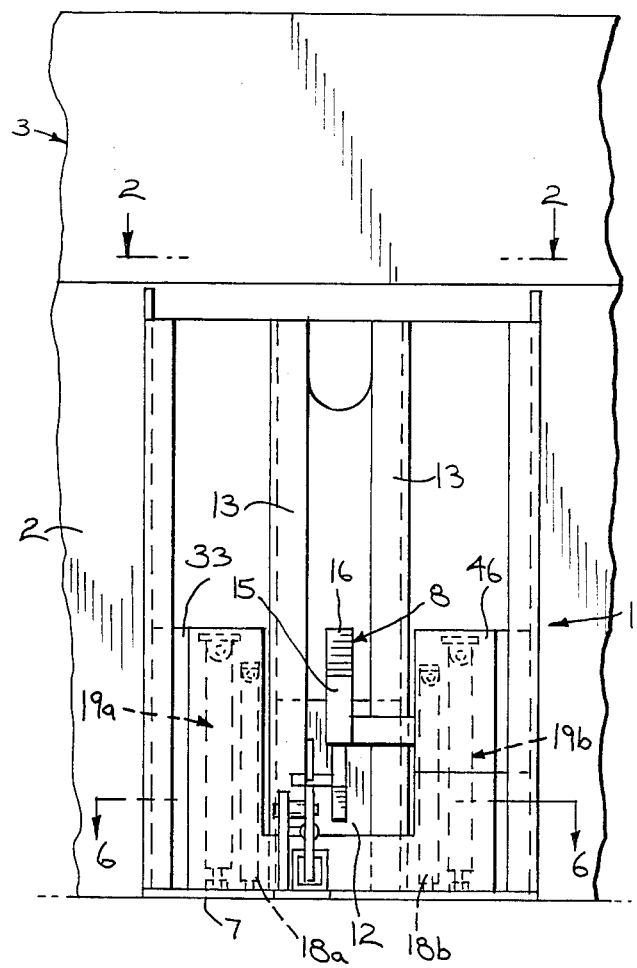
FIG. 3 is a front elevation of the vehicle restraint shown with a restraining member being in the lower storage position.
Figure 2:
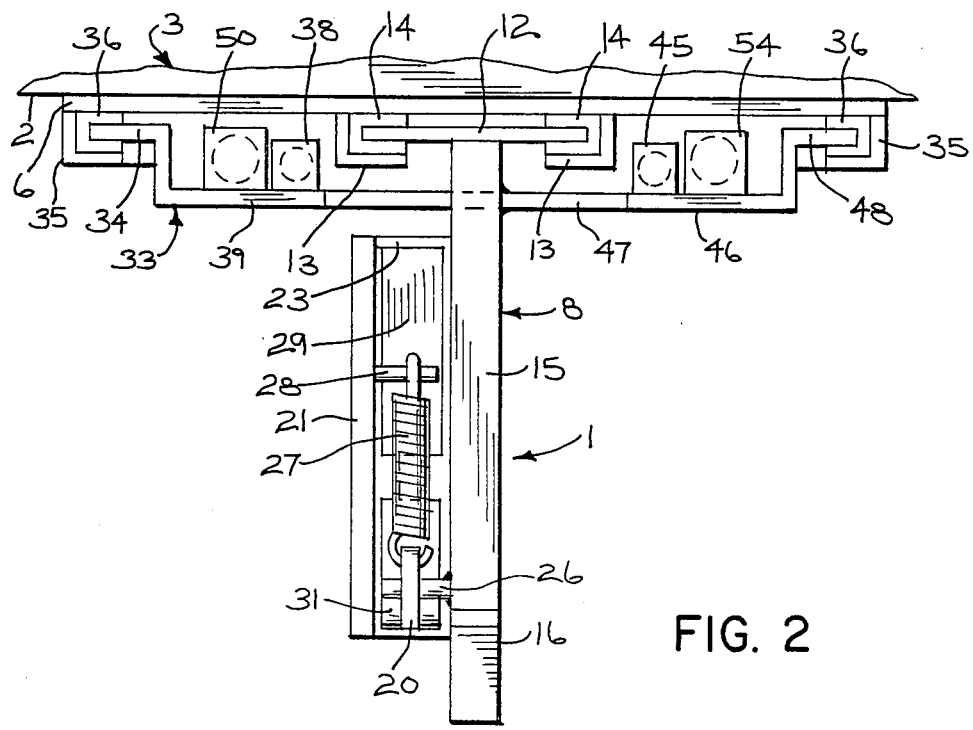
FIG. 2 is a top plan view of the vehicle restraint.
Figure 4:
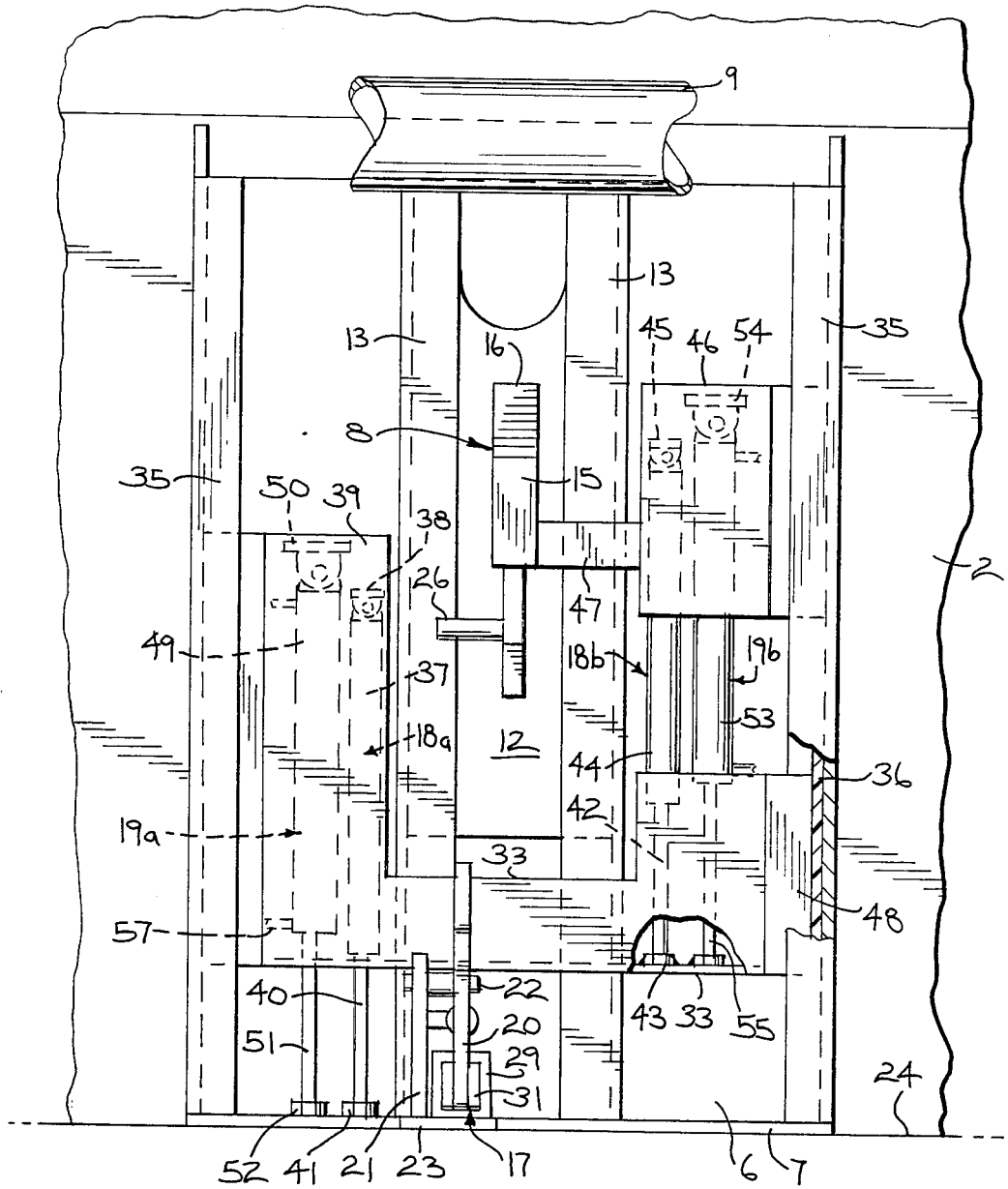
FIG. 4 is view similar to FIG. 3 showing the restraining member in a partially raised position.

The drawings illustrate a vehicle restraint 1 which is mounted on the front face 2 of a loading dock 3.

The upper surface of dock 3 is formed with pit 4 and a dockboard, not shown, can be mounted in the pit. The dockboard can be a type as illustrated in U.S. Pat. No. 4,068,338 and in itself forms no part of the invention. The dockboard when operated serves to bridge the gap between the loading dock and the bed of a truck parked in front of the dock to enable material handling equipment such as a forklift truck to move between the dock and the truck bed.

Mounted on the front face of the dock on either side of pit 4 are bumpers 5 which are adapted to be engaged by the rear end of the truck as the truck backs toward the loading dock.

The vehicle restraint 1 of the invention includes a vertical mounting plate 6 which is secured to front face 2 of dock 3 by suitable anchor bolts, not shown. A horizontal base plate 7 extends outwardly from the lower edge of mounting plate 6.

A vehicle restraining member 8 is mounted for vertical movement on mounting plate 6 and is adapted to engage the ICC bar 9 located at the rear of the truck beneath bed 10. ICC bar 9 can have various cross sectional configurations, and is suspended from truck bed 10 through a pair of vertical legs 11. ICC bar 9 prevents a vehicle from underriding the truck in the event of a rear end collision.

Restraining member 8 includes a slide 12 that is mounted for sliding movement within a pair of angle shaped guide tracks 13 which are secured to the front face of mounting plate 6. Generally U-shaped pads 14 formed of a material having a low coefficient of friction, such as nylon, are interposed between the ends of the slide 12 and the guide tracks 13 to facilitate sliding movement of the slide relative to the tracks.

Extending outwardly from slide 12 is a hook 15 having an upwardly extending tip portion 16.

Restraining member 8 is movable from a lower storage position, as shown in FIG. 1, to an upper operative position where the hook 15 will engage the ICC bar 9. Restraining member 8 is locked or held in the lower storage position by a latching mechanism indicated generally by 17. On release of the latching mechanism, the restraining member is moved upwardly by a resilient biasing means which preferably takes the form of a pair of gas spring units 18a and 18b. After the loading operation is completed, restraining member 8 is moved downwardly against the force of the gas spring units 18a and 18b by a pair of hydraulic cylinder units 19a and 19b.

Latching mechanism 17 includes a latch 20 which is pivoted to a vertical plate 21 by pivot pin 22. Plate 21 is secured edgewise to base plate 23 which is mounted on the driveway 24 in front of the dock 3.

Latch 20 is provided with a recess or notch 25 that is arranged to engage a pin 26 extending laterally from hook 15. Latch 20 is biased to the latching position by a spring 27 which is connected between latch 20 and a lug 28 that extends outwardly from plate 21.

To move latch 20 to the release position, a cylinder 29 is mounted on plate 23 and piston rod 30 of cylinder 29 carries a clevis 31 which is pivotally connected to the lower end of latch 20. By introducing fluid into cylinder 29 to extend piston rod 30, the latch 20 will be pivoted against the force of spring 27 to release pin 26 from engagement with recess 25.

Figure 7:
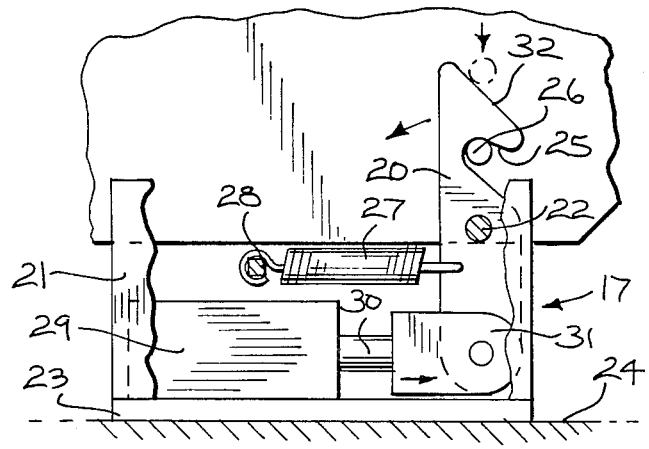
FIG. 7 is an enlarged side elevation of the latching mechanism for latching the vehicle restraint in the lowered storage position.

As shown in FIG. 7, the upper end of latch 20 is provided with an inclined cam surface 32, and as the hook 15 is moved downwardly toward the storage position, pin 26 will engage the inclined surface 32, thereby pivoting latch 20 against the force of spring 27 to enable the pin to be received within recess 25.

Figure 6:
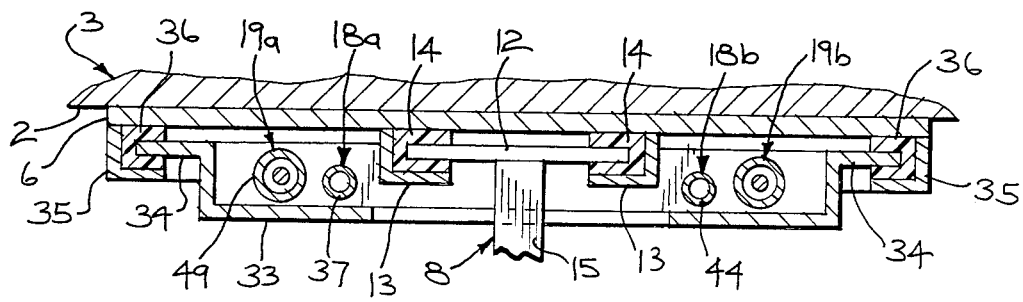
FIG. 6 is a section taken along 6—6 of FIG. 3.
Figure 5:
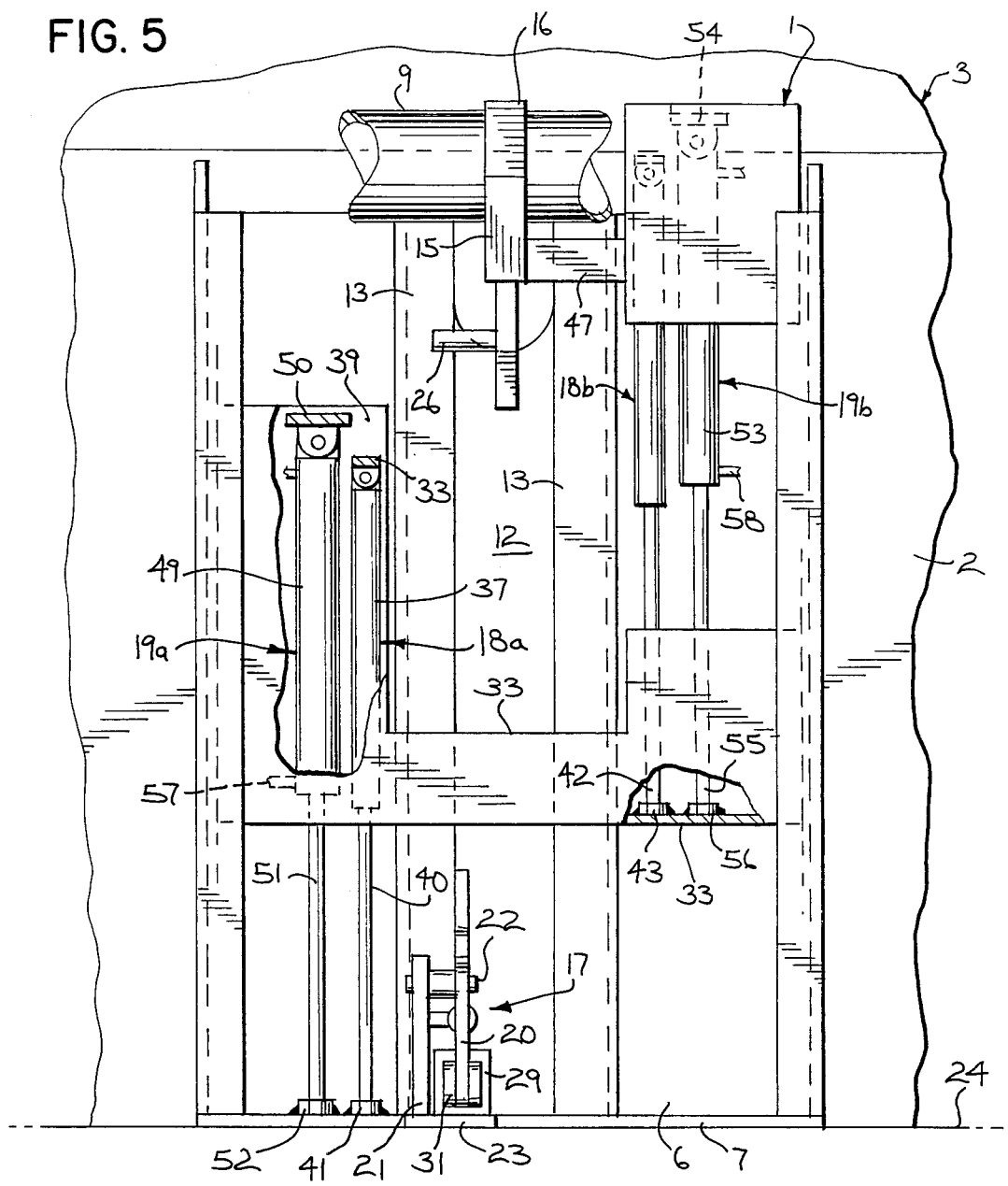
FIG. 5 is view similar to FIG. 3 showing the restraining member in the operative position engaged with the ICC bar.

Restraining member 8 is biased upwardly on release of latching mechanism 17 by the gas spring units 18a and 18b. In this regard a generally U-shaped plate 33 is positioned parallel to mounting plate 6 and is provided with a pair of generally L-shaped side guides 34 which slide within tracks 35 located along the side edges of mounting plate 6, as best shown in FIG. 6. Friction resistant pads 36 are connected to the tracks 35 to facilitate sliding movement of plate 33.

Gas spring unit 18a includes a cylinder 37 which is pivotally connected to a lug 38 extending inwardly from the longer leg 39 of plate 33. The lower end of piston rod 40, which is slidable in cylinder 37, is threaded in a nut 41 on base plate 7.

Gas spring unit 18a is of conventional construction including a closed cylinder which contains a compressed gas such as air or nitrogen. The compressed gas, generally under a pressure of about 1200 to 1800 psi, exerts pressure on the gas spring piston and provides a biasing action urging the gas spring to extend. In a conventional gas spring, as used in the invention, opposite sides of the piston are connected via an orifice through the piston, thus equalizing the pressure on both sides. However, the areas of the opposite surface of the piston on which the pressure acts are not equal due to the presence of the piston rod, so that a net force acting to extend the piston rod is created.

With this construction, release of the latch mechanism 17 will cause the gas spring unit 18a to extend to thereby move plate 33 upwardly relative to mounting plate 6.

The lower end of piston rod 42 of gas spring unit 18b is threaded in nut 43 which is mounted on the lower flange of plate 33, while the upper end of cylinder 44 of gas spring unit 18b is pivotally connected to lug 45 that projects inwardly from a slide plate 46. Connecting slide plate 46 to hook 15 is an arm 47. One side edge of slide plate 46 is provided with an L-shaped guide 48 which is slidable in the corresponding guide track 35.

With this construction, on release of the latching mechanism 17, the gas spring unit 18a will move slide plate unit 33 upwardly relative to the mounting plate 6 and the gas spring unit 18b will move slide plate 46 upwardly relative to plate 33. As hook 15 is connected integrally to slide plate 46, the hook will be moved upwardly with slide plate 46 until the hook engages the ICC bar 9. The use of the two gas spring units 18a and 18b enables the restraining member 8 to have a greater vertical stroke of movement with a lesser overall height of the vehicle restraint in its stored, non-operative position.

Depending upon the weight involved, the slide plates 33 and 46 can move upwardly in unison, of if, as shown, the slide plate 46 has a lesser size and weight than plate 33 and if the gas spring units are of comparable size, the slide plate 46 will move upwardly at a faster rate than the slide plate 33.

As previously noted, the restraining member 8 is moved downwardly to the storage position by operation of the hydraulic cylinder units 19a and 19b. The upper end of cylinder 49 of unit 19a is pivotally connected to lug 50 that projects inwardly from leg 39 of slide plate 33, while piston rod 51, that is slidable in cylinder 49, is threaded in nut 52 on base plate 7.

Cylinder 53 of hydraulic cylinder unit 19b is pivotally connected to lug 54 that extends inwardly from slide plate 46, while piston rod 55 is threaded in nut 56 that is mounted on the lower flange of plate 33.

By introducing hydraulic fluid into the lower ends of cylinders 49 and 53 through lines 57 and 58 respectively, the piston rods will be retracted to move the slide plates 33 and 46 downwardly against the force of the gas spring units 18 to thereby return the restraining member 6 to its lower storage position.

OPERATION

The vehicle restraint 1 is normally retained in the lower storage position as shown in FIG. 1 in which latch 20 is engaged with pin 26 on hook 15.

As a truck backs toward the loading dock, the rear end of the truck will engage the bumpers 5, and cylinder 29 will then be actuated either by an operator utilizing controls on the dock or through controls operated as consequence of movement of the dockboard, to pivot latch 20 and release the pin 26. The gas spring units 18 will then move the slide plates 33 and 46 upwardly until the hook 15 engages the ICC bar 9. As hydraulic cylinder units 19 are not pressurized at this time, the cylinder units 19 will extend along with extension of gas springs 18.

Gas spring units 18 are designed so that the hook will always engage the ICC bar 7 at a position short of complete extension of the gas spring units so that if the ICC bar moves upwardly during a loading operation, the gas springs will extend to follow the upward movement. Conversely, if the truck bed 8 lowers during a loading operation, lowering of the truck bed 10 and ICC bar 9 will retract the gas spring units.18 to follow the downward movement.

After the loading operation is completed, the hydraulic cylinder units 19 are retracted through suitable controls on the loading dock to move slide plates 33 and 46 downwardly against the force of the gas spring units 18 to thereby move the restraining member 8 to the storage position. As the restraining member 8 approaches its storage position, pin 26 will engage the cam surface 32, thereby camming the latch 20 outwardly and enabling the pin 26 to be engaged by notch 25 to latch the restraining member 8 in the storage position.

While the drawings and description have illustrated the use of gas spring units as the resilient biasing force to urge the restraining member upwardly to its operative position, it is contemplated that other resilient mechanisms such as coil springs could be utilized. Similarly, power operated means other than hydraulic cylinder units 19 can be employed to move the restraining member downwardly against the force of the biasing mechanism.

The vehicle restraint of the invention provides a positive engagement of the ICC bar on the truck, and through the use of the resilient biasing means, such as the gas spring units, the restraining member can follow upward and downward float of the truck bed during a loading operation.

Various modes of carrying out the invention are contemplated as being within the scope of the following claims particularly pointing out and distinctly claiming the subject matter which is regarded as the invention.

We claim:

1. A vehicle restraint for preventing movement of a vehicle away from a fixed structure, comprising a frame mounted on said structure, a pair of slides each mounted for movement on said frame, a restraining member operably connected to a first of said slides, and biasing means including a first biasing member interconnecting the frame and the second of said slides and a second biasing member interconnecting the second slide and said first slide, said biasing members acting sequentially to move said restraining member between a lower storage position and an upper operative position where said restraining member is located outwardly of an abutment on said vehicle to prevent said vehicle from moving away from said fixed structure, said biasing members enabling said restraining member to follow upward and downward movement of said abutment during a loading operation when said restraining member is in the operative position.

2. The vehicle restraint of claim 1, wherein said first and second biasing members constitute gas springs.

3. A truck restraint for preventing accidental movement of a truck away from a loading dock, comprising a frame mounted on the vertical face of a loading dock, a pair of slides each mounted for vertical movement on said frame, a restraining member operably connected to a first of said slides, and resilient means interconnecting said frame and said restraining member and exerting an upwardly directed force of sufficient magnitude to bias the restraining member from a lower storage position to an upper operative position where said restraining member is engageable with an abutment on said truck, and power operated means for overcoming said upwardly directed force and moving said restraining member from the operative position to the storage position, said resilient means including a first resilient member interconnecting said frame and a second of said slides and a second resilient member interconnecting said first slide and said second slide, the forces exerted by said first and second resilient members acting to move said restraining member from the storage position to the operative position, and said resilient members enabling said restraining member to follow upward and downward movement of said abutment during a loading operation and when said restraining member is in the operative position.

4. The vehicle restraint of claim 3, wherein each resilient member comprises a gas spring, and said power operated means comprises a hydraulic cylinder unit.

5. The vehicle restraint of claim 3, wherein said power operated means comprises a pair of hydraulic cylinder units, a first of said cylinder units interconnecting said second slide and said first slide and a second of said cylinder units interconnecting said first slide and said frame, whereby operation of said cylinder units will move said slide and said restraining member to the storage position.

6. The vehicle restraint of claim 5, wherein said first and second resilient members are gas springs and are mounted on opposite sides of said restraining member and said first and second cylinder units are mounted on opposite sides of said restraining member.

7. The truck restraint of claim 3, and including locking means for locking said restraining member in the lower storage position, and means for releasing said locking means whereby said resilient means will move said restraining member to the operative position.

8. In combination, loading dock means having a vertical face, a frame mounted on said dock means and including vertically extending guide means secured to said face, truck restraining means including a slide mounted for vertical linear movement on said guide means and also including a restraining member rigidly connected to said slide and extending outwardly therefrom, said truck restraining means being movable between a lower storage position and an upper operative position, biasing means interconnecting said frame and said restraining means and constructed and arranged to exert a vertical force of sufficient magnitude to move the restraining means in a substantially vertical linear path from said storage position to said operative position where said restraining member is engageable with an abutment on a truck, and power operated means interconnecting said restraining means and said frame and constructed and arranged to exert a downward vertical force of sufficient magnitude to overcome the force exerted by said biasing means to move said restraining means downwardly from the operative position to said lower storage position.

9. The combination of claim 8, and including locking means for locking said restraining means in the lower storage position, and means for releasing said locking means whereby said biasing means will move said restraining means to the operative position.

* * * * *